United States Patent
Kodama et al.

(10) Patent No.: US 11,732,689 B2
(45) Date of Patent: Aug. 22, 2023

(54) WIND TURBINE DRIVE CONTROL DEVICE, WIND TURBINE POWER SUPPLY DEVICE, WIND POWER GENERATION DEVICE, AND CONTROL METHOD

(71) Applicant: Nabtesco Corporation, Tokyo (JP)

(72) Inventors: Haruo Kodama, Tokyo (JP); Hirofumi Komori, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 193 days.

(21) Appl. No.: 17/100,234

(22) Filed: Nov. 20, 2020

(65) Prior Publication Data

US 2021/0199089 A1 Jul. 1, 2021

(30) Foreign Application Priority Data

Dec. 25, 2019 (JP) ................................ 2019-234560

(51) Int. Cl.
*F03D 7/02* (2006.01)
*F03D 7/04* (2006.01)

(52) U.S. Cl.
CPC ......... *F03D 7/0204* (2013.01); *F03D 7/0244* (2013.01); *F03D 7/042* (2013.01); *F05B 2270/331* (2013.01)

(58) Field of Classification Search
CPC .... F03D 7/0204; F03D 7/0244; F03D 7/0248; F03D 7/04; F03D 7/042; F05B 2270/331;
(Continued)

(56) References Cited

U.S. PATENT DOCUMENTS

2004/0264082 A1* 12/2004 Suliman .................. F03D 9/255
361/62
2009/0051222 A1* 2/2009 Schellings .............. H02J 3/381
416/61
(Continued)

FOREIGN PATENT DOCUMENTS

CA 3066194 A1 * 1/2019 ........... F03D 7/0224
CN 104405583 A * 3/2015
(Continued)

OTHER PUBLICATIONS

Extended European Search Report dated May 21, 2021, issued in corresponding European Patent Application No. 20209386.0 (7 pgs.).
(Continued)

*Primary Examiner* — Brian P Wolcott
*Assistant Examiner* — Jesse M Prager
(74) *Attorney, Agent, or Firm* — Pillsbury Winthrop Shaw Pittman, LLP

(57) ABSTRACT

A wind turbine drive control device according to one aspect of the present invention is a wind turbine drive control device for controlling a plurality of drive devices for moving two structures included in a wind power generation device relative to each other, the wind turbine drive control device including: an obtaining unit for obtaining a plurality of information items related to loads occurring between each of the plurality of drive devices and one of the two structures that receives forces generated by the plurality of drive devices; and a control unit for controlling the plurality of drive devices in such a manner that, in a state where each of the plurality of drive devices is controlled to generate a predetermined braking force, the braking force of at least one first drive device among the plurality of drive devices is increased, based on the plurality of information items.

8 Claims, 11 Drawing Sheets

(58) Field of Classification Search
CPC . F05B 2270/335; F05B 2270/337; F16H 1/22
See application file for complete search history.

(56) References Cited

U.S. PATENT DOCUMENTS

| | | | |
|---|---|---|---|
| 2009/0243297 A1* | 10/2009 | Nohara | F16H 1/32 |
| | | | 290/44 |
| 2013/0170989 A1 | 7/2013 | Trede et al. | |
| 2016/0305407 A1 | 10/2016 | Osako | |
| 2019/0203697 A1 | 7/2019 | Nohara et al. | |

FOREIGN PATENT DOCUMENTS

| | | |
|---|---|---|
| EP | 3165764 A1 | 5/2017 |
| JP | 2011-127551 A | 6/2011 |
| JP | 2015-140777 A | 8/2015 |
| JP | 2018-003820 A | 1/2018 |
| WO | 2011/096078 A1 | 8/2011 |

OTHER PUBLICATIONS

Notice of Reasons for Rejection dated May 9, 2023, issued in corresponding Japanese Patent Application No. 2019-234560 with English translation (9 pgs.).

\* cited by examiner

WIND TURBINE DRIVE CONTROL DEVICE, WIND TURBINE POWER SUPPLY DEVICE, WIND POWER GENERATION DEVICE, AND CONTROL METHOD

CROSS-REFERENCE TO RELATED APPLICATIONS

This application is based on and claims the benefit of priority from Japanese Patent Application Serial No. 2019-234560 (filed on Dec. 25, 2019), the contents of which are hereby incorporated by reference in their entirety.

TECHNICAL FIELD

The present invention relates to a wind turbine drive control device, a wind turbine power supply device, a wind power generation device, and a control method.

BACKGROUND

Some of conventionally known wind power generation devices have a yaw control function for adjusting the orientation of a blade in accordance with the wind direction. An example of such wind power generation devices is disclosed in Japanese Patent Application Publication No. 2015-140777 ("the '777 Publication"). The wind power generation device disclosed in the '777 Publication is installed on the land or on the ocean, and it includes a tower serving as a support post for a power generator, a nacelle disposed on top of the tower and containing the power generator, and a rotor disposed on one end of the nacelle and formed of a hub and a blade for converting the received wind force into rotation energy. This wind power generation device includes a yaw drive device disposed in a connection portion between the tower and the nacelle and configured to control the positions of the nacelle and the rotor relative to the tower. The '777 Publication discloses that the provided wind power generation device has a high availability, which is achieved by the yaw drive device which disconnects transmission of a yaw drive force to minimize an impact of yaw control failure due to malfunctions of the yaw drive device.

In the above wind power generation device, when fixation occurs between a yaw bearing gear and a pinion gear due to gear deformation caused by strong winds such as those of a typhoon, the transmission of the yaw drive force from the pinion gear to the yaw bearing gear is disconnected. In the above wind power generation device, the fixation between the yaw bearing gear and the pinion gear is detected when the electric current in the yaw inverter exceeds a rated current or a predetermined interlock value.

A wind power generating device includes a larger number of yaw drive devices as the wind turbine is larger. With a large number of yaw drive devices installed, the load occurring between the yaw bearing gear and the pinion gear may vary among yaw drive devices. When the variation of the loads among the yaw drive devices is large, one or more of the yaw drive devices may undergo an excessive load.

SUMMARY

The present invention addresses the above drawback, and one object thereof is to provide a wind turbine drive control device, a wind turbine power supply device, a wind power generation device, and a control method that facilitate inhibiting the variation of the loads among the drive devices.

To achieve the above object, a wind turbine drive control device according to one aspect of the present invention is a wind turbine drive control device for controlling a plurality of drive devices for moving two structures included in a wind power generation device relative to each other, the wind turbine drive control device comprising: an obtaining unit for obtaining a plurality of information items related to loads occurring between each of the plurality of drive devices and one of the two structures that receives forces generated by the plurality of drive devices; and a control unit for controlling the plurality of drive devices in such a manner that, in a state where each of the plurality of drive devices is controlled to generate a predetermined braking force, the braking force of at least one first drive device among the plurality of drive devices is increased, based on the plurality of information items obtained by the obtaining unit. With this configuration, the braking force of at least one drive device among the plurality of drive devices can be increased. Therefore, the braking force of the drive device under a high load can be reduced to inhibit the variation of the loads among the drive devices. As a result, it is possible to facilitate inhibiting the variation of the loads among the drive devices.

The above wind turbine drive control device may be configured such that the control unit controls the plurality of drive devices in such a manner that, in a state where each of the plurality of drive devices is controlled to generate a predetermined braking force, the braking force of at least one first drive device among the plurality of drive devices is increased and the braking force of a second drive device other than the at least one first drive device is reduced, based on the plurality of information items obtained by the obtaining unit. With this configuration, the braking force of at least one first drive device among the plurality of drive devices can be increased, and the braking force of a second drive device other than the at least one first drive device can be reduced. Therefore, it is possible to inhibit the variation of the loads among the drive devices.

To achieve the above object, a wind turbine power supply device according to one aspect of the present invention is a wind turbine power supply device for supplying an electric power to a plurality of drive devices for moving two structures included in a wind power generation device relative to each other, each of the plurality of drive devices including a brake unit that generates a higher braking force as supplied with a higher electric power, the wind turbine power supply device comprising: a power supply circuit for supplying an electric power to each of the plurality of drive devices; an obtaining unit for obtaining a plurality of information items related to loads occurring between each of the plurality of drive devices and one of the two structures that receives forces generated by the plurality of drive devices; and a control unit for controlling the power supply circuit in such a manner that, in a state where the power supply circuit is controlled to supply a predetermined electric power to each of the plurality of drive devices, the electric power supplied to the brake unit of at least one first drive device among the plurality of drive devices is increased, based on the plurality of information items obtained by the obtaining unit. With this configuration, the electric power supplied to the brake unit of at least one drive device among the plurality of drive devices can be increased. Therefore, the braking force of the drive device under a high load can be reduced to inhibit the variation of the loads among the drive devices. As a result, it is possible to facilitate inhibiting the variation of the loads among the drive devices.

The above wind turbine power supply device can be configured such that the control unit controls the power supply circuit in such a manner that, in a state where the power supply circuit is controlled to supply a predetermined electric power to each of the plurality of drive devices, the electric power supplied to at least one first drive device among the plurality of drive devices is increased and the electric power supplied to a second drive device other than the at least one first drive device is reduced, based on the plurality of information items obtained by the obtaining unit. With this configuration, the electric power supplied to at least one first drive device among the plurality of drive devices can be increased, and the electric power supplied to a second drive device other than the at least one first drive device can be reduced. Therefore, it is possible to inhibit the variation of the loads among the drive devices.

To achieve the above object, a wind power generation device according to one aspect of the present invention is a wind power generation device comprising: a plurality of drive devices each including a brake unit, a drive unit, and a transmission unit, the brake unit being configured to generate a braking force for stopping a second structure relative to a first structure, both the first and second structures being included in the wind power generation device, the brake unit being further configured to generate a higher braking force as supplied with a higher electric power, the drive unit being configured to generate a drive force for moving the second structure relative to the first structure, the transmission unit being configured to transmit the braking force and the drive force to the first structure; a first power supply unit for supplying a first electric power to the brake unit of each of the plurality of drive devices; a second power supply unit for supplying a second electric power to the brake unit of each of the plurality of drive devices, the second electric power being higher than the first electric power; a switching unit for switching between a state in which the first electric power is supplied from the first power supply unit to the plurality of drive devices and a state in which the second electric power is supplied from the second power supply unit to the plurality of drive devices; an obtaining unit for obtaining a plurality of information items related to loads occurring between each of the plurality of drive devices and one of the two structures that receives forces generated by the plurality of drive devices; and a control unit for controlling the plurality of drive devices in such a manner that, in a state where the first and second power supply units are controlled to supply a predetermined electric power to each of the plurality of drive devices so as to control the plurality of drive devices such that each of the plurality of drive devices generates a predetermined braking force, the switching unit is controlled to cause the electric power supplied to at least one first drive device among the plurality of drive devices to be increased and cause the electric power supplied to a second drive device other than the at least one first drive device to be reduced, based on the plurality of information items obtained by the obtaining unit, thereby increasing the braking force of the at least one first drive device among the plurality of drive devices and reducing the braking force of the second drive device other than the at least one first drive device. With this configuration, the plurality of drive devices are controlled in such a manner that the switching unit is controlled to cause the electric power supplied to at least one first drive device among the plurality of drive devices to be increased and cause the electric power supplied to a second drive device other than the at least one first drive device to be reduced, thereby increasing the braking force of the at least one first drive device among the plurality of drive devices and reducing the braking force of the second drive device other than the at least one first drive device. Therefore, it is possible to inhibit the variation of the loads among the drive devices.

To achieve the above object, a control method according to one aspect of the present invention is a control method of controlling a wind turbine drive control device for controlling a plurality of drive devices for moving two structures included in a wind power generation device relative to each other, the control method comprising: obtaining a plurality of information items related to loads occurring between each of the plurality of drive devices and one of the two structures that receives forces generated by the plurality of drive devices; and controlling the plurality of drive devices in such a manner that, in a state where each of the plurality of drive devices is controlled to generate a predetermined braking force, the braking force of at least one first drive device among the plurality of drive devices is increased, based on the plurality of information items. With this method, the braking force of at least one drive device among the plurality of drive devices can be increased. Therefore, the braking force of the drive device under a high load can be reduced to inhibit the variation of the loads among the drive devices. As a result, it is possible to facilitate inhibiting the variation of the loads among the drive devices.

The above control method may further comprise controlling the plurality of drive devices in such a manner that, in a state where each of the plurality of drive devices is controlled to generate a predetermined braking force, the braking force of at least one first drive device among the plurality of drive devices is increased and the braking force of a second drive device other than the at least one first drive device is reduced, based on the plurality of information items. With this method, the braking force of at least one first drive device among the plurality of drive devices can be increased, and the braking force of a second drive device other than the at least one first drive device can be reduced. Therefore, it is possible to inhibit the variation of the loads among the drive devices.

To achieve the above object, a control method according to one aspect of the present invention is a control method of controlling a wind turbine power supply device for supplying an electric power to a plurality of drive devices for moving two structures included in a wind power generation device relative to each other, each of the plurality of drive devices including a brake unit that generates a higher braking force as supplied with a higher electric power, the control method comprising: obtaining a plurality of information items related to loads occurring between each of the plurality of drive devices and one of the two structures that receives forces generated by the plurality of drive devices; and controlling a power supply circuit in such a manner that, in a state where the power supply circuit for supplying an electric power to each of the plurality of drive devices is controlled to supply a predetermined electric power to each of the plurality of drive devices, the electric power supplied to the brake unit of at least one first drive device among the plurality of drive devices is increased, based on the plurality of information items. With this method, the electric power supplied to the brake unit of at least one drive device among the plurality of drive devices can be increased. Therefore, the braking force of the drive device under a high load can be reduced to inhibit the variation of the loads among the drive devices. As a result, it is possible to facilitate inhibiting the variation of the loads among the drive devices.

The above control method may further comprise controlling the power supply circuit in such a manner that, in a state where the power supply circuit for supplying an electric power to each of the plurality of drive devices is controlled to supply a predetermined electric power to each of the plurality of drive devices, the electric power supplied to the at least one first drive device among the plurality of drive devices is increased and the electric power supplied to a second drive device other than the at least one first drive device is reduced, based on the plurality of information items. With this method, the electric power supplied to at least one first drive device among the plurality of drive devices can be increased, and the electric power supplied to a second drive device other than the at least one first drive device can be reduced. Therefore, it is possible to inhibit the variation of the loads among the drive devices.

ADVANTAGEOUS EFFECTS

According to one aspect of the present invention, it is possible to facilitate inhibiting the variation of the loads among the drive devices.

DESCRIPTION OF THE PREFERRED EMBODIMENTS

With reference to the drawings, the following describes a wind turbine drive control device, a wind turbine power supply device, a wind power generation device, and a control method according to the embodiment.

Figure 1:
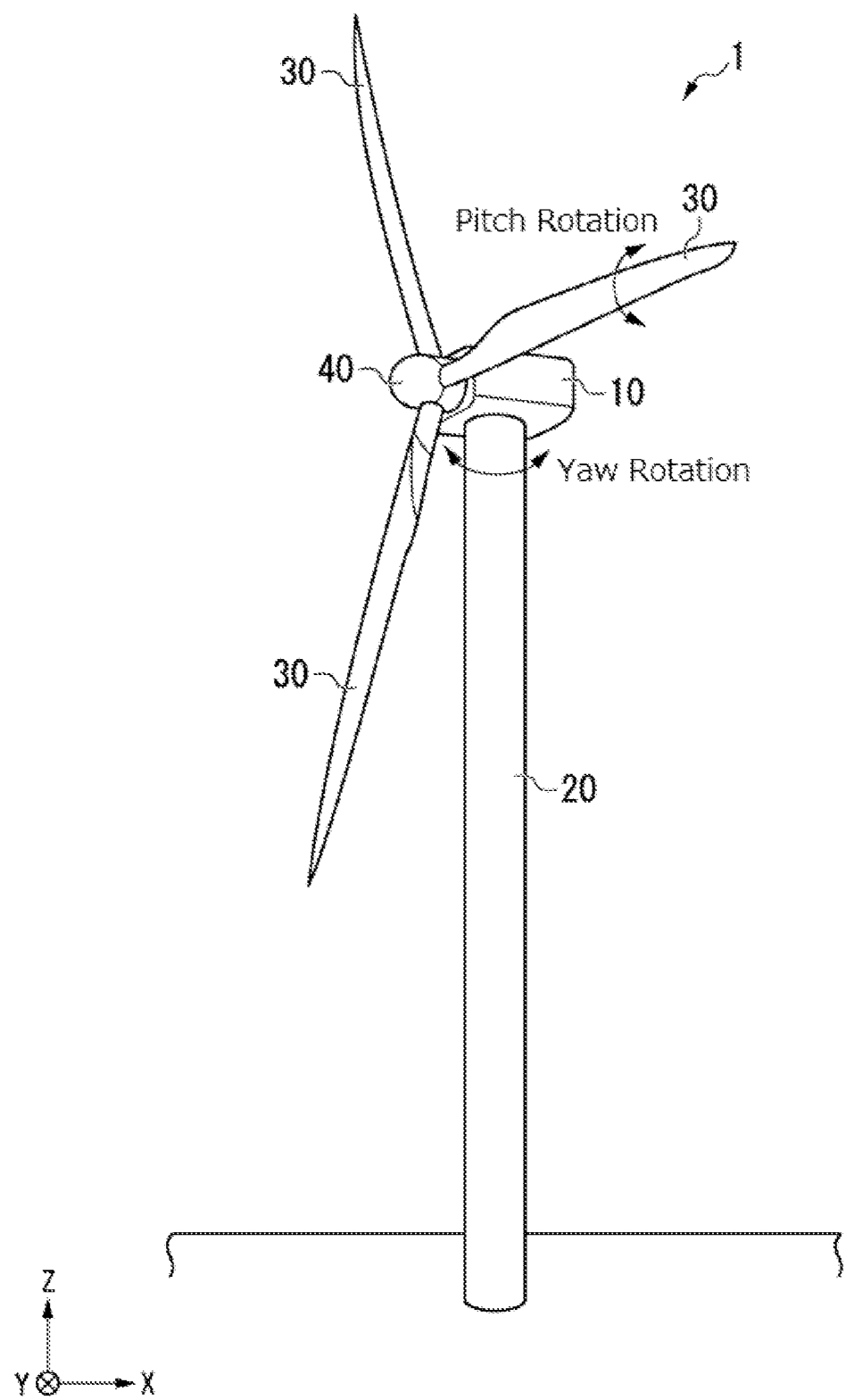
FIG. 1 is a perspective view showing an example of a wind power generation device according to an embodiment of the present invention.

FIG. 1 is a perspective view showing an example of a wind power generation device according to an embodiment of the present invention. The wind power generation device 1 includes, for example, a nacelle 10, a tower 20, a blade 30, and a hub 40. The tower 20 and the nacelle 10 are examples of two structures included in the wind power generation device 1. The tower 20 and the nacelle 10 move relative to each other by a force from drive devices (yaw drive devices 100). The tower 20 is an example of a first structure that is a part of the wind power generation device 1 installed fixedly, and the nacelle 10 is an example of a second structure. The second structure moves relative to the first structure by the drive force from the yaw drive devices 100 and stops relative to the first structure by the braking force from the yaw drive devices 100.

The nacelle 10 is mounted on the top end (the end in the Z direction) of the tower 20. The blade 30 is mounted to the nacelle 10 via the hub 40. The nacelle 10 turns to adjust the orientation of the blade 30 and the hub 40 in the yaw direction. The nacelle 10 includes a yaw drive mechanism for generating a yaw drive force for rotating the nacelle 10 in the yaw direction. The yaw drive devices are an example of drive devices and wind turbine drive devices. The drive devices and the wind turbine drive devices generate a force for rotating the orientation of the blade 30 and the hub 40 (the orientation of a wind turbine) in accordance with the wind direction. The yaw drive devices rotate the orientation of the blade 30 and the hub 40 (the orientation of the wind turbine) in accordance with the wind direction. The nacelle 10 is an example of a structure not provided with a force generated by the drive devices. The tower 20 is an example of a structure provided with a force generated by the drive devices.

The tower 20 is embedded on the land or on the sea. The tower 20 extends upward in a vertical direction from the land or the sea. The nacelle 10 is mounted on the top end of the tower 20. The tower 20 includes a ring gear 22 for driving the turning of the nacelle 10 in the yaw direction.

The blade 30 receives wind force and generates a rotational force. In the embodiment, three blades 30 are provided.

The hub 40 is mounted to the nacelle 10, and a plurality of blades 30 are mounted to the hub 40. The hub 40 transmits to a rotating shaft the rotational force (motive power) generated by the wind force received by the blades 30. The hub 40 transmits the rotational force based on the wind force to the nacelle 10 via the rotating shaft.

The hub 40 includes pitch drive mechanisms for generating a pitch drive force for rotating the blades 30 in the pitch direction. Each blade 30 is provided with a drive mechanism for generating a pitch drive force. The pitch drive mechanisms rotate the blades 30 in the pitch direction to control the angles of the blades 30 in accordance with the wind velocity.

In the wind power generation device 1, the motive power generated by the rotation of the blades 30 is transmitted from the hub 40 to a power generator (not shown) in the nacelle 10 and converted into an electric power. In this way, the wind power generation device 1 performs wind power generation.

Figure 2:
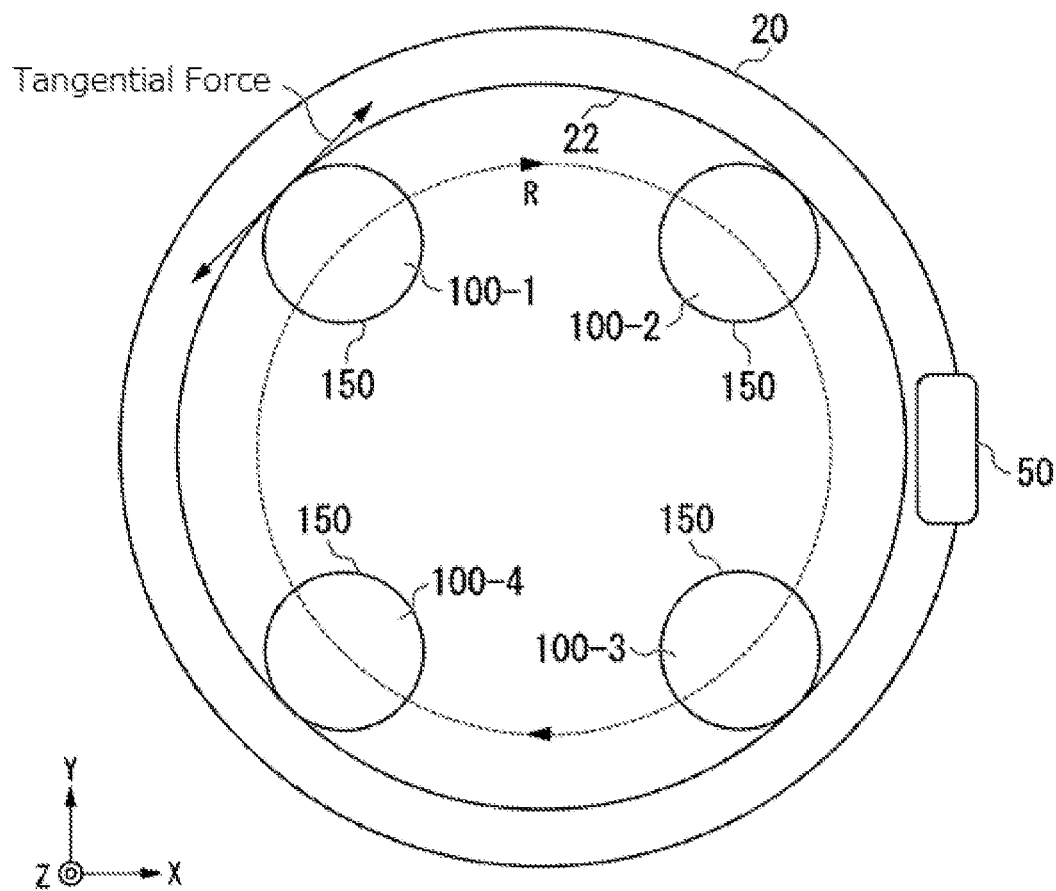
FIG. 2 is a top view showing a relationship between a tower and yaw drive devices according to the embodiment.

FIG. 2 is a top view showing a relationship between the tower and the yaw drive devices according to the embodiment. The yaw drive devices 100 for generating the yaw drive force are mounted to the nacelle 10. In the embodiment, four yaw drive devices 100-1, 100-2, 100-3, and 100-4 are mounted to the nacelle 10. These yaw drive devices may be hereinafter collectively referred to simply as "the yaw drive devices 100." In FIG. 2, the ring gear 22 is formed in the inner wall of the tower 20. The ring gear 22 meshes with pinion gears 150 of the yaw drive devices 100. The yaw drive devices 100 revolve in the R direction in FIG. 2 by the motor drive force. The yaw drive devices 100 may also be able to revolve in the opposite direction to the R direction.

With the ring gear 22 and the pinion gear 150 meshing with each other, a force such as a gust of wind applied to the nacelle 10, the tower 20 or the like generates a tangential force between the ring gear 22 and the pinion gears 150. The tangential force is a force generated in the tangential direction of the gear forming surface of the ring gear 22. The tangential force applies a torsional stress to a speed reducing unit 164 of each of the yaw drive devices 100. The tangential force applies a tensile stress and a compressive stress to a fixture in each of the yaw drive devices 100. In the embodiment, the ring gear 22 is provided in the tower 20 and the yaw drive devices 100 are fixed to the nacelle 10, but this example is not limitative. It is also possible that the nacelle 10 includes a gear portion corresponding to the ring gear 22, and the tower 20 includes yaw drive devices corresponding to the yaw drive devices 100.

Figure 3:
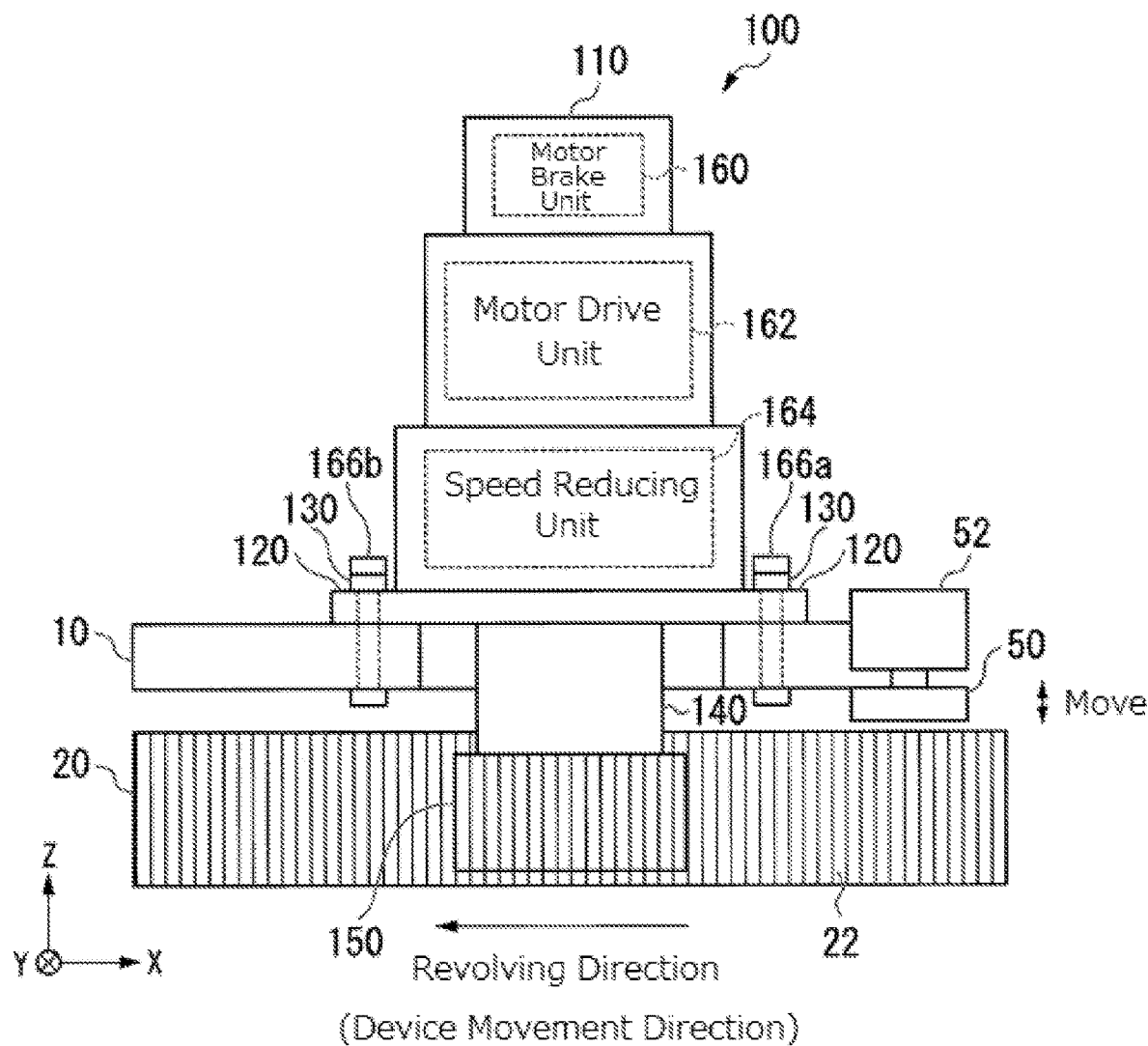
FIG. 3 shows an example of the yaw drive device according to the embodiment.

FIG. 3 shows an example of the yaw drive device according to the embodiment. The yaw drive device 100 includes, for example, a casing 110, a flange 120, fastening bolts 130, an output shaft 140, and a pinion gear 150. The flange 120 is mounted to the casing 110. The flange 120 is connected to the nacelle 10 with the fastening bolts 130. One end of the output shaft 140 is connected to the interior of the casing 110 and the flange 120, and the other end of the output shaft 140 has the pinion gear 150 provided thereon. The pinion gear 150 is positioned so as to mesh with the ring gear 22. The pinion gear 150 rotates by the drive force output from the output shaft 140 to cause the yaw drive device 100 to revolve in the revolving direction (device movement direction or reverse X direction). The yaw drive device 100 in turn causes the nacelle 10 to turn relative to the tower 20. The fastening bolts 130 are an example of the fixtures. The fixtures are elements for fixing the yaw drive device 100 to the nacelle 10. The fixtures are not limited to the fastening bolts 130 but may be other known members. The output shaft 140 and the pinion gear 150 are an example of a transmission unit. The transmission unit is an element for transmitting a drive force and a braking force from the yaw drive device 100 to the tower 20. If the drive device is fixed to the tower 20, the transmission unit is an element for transmitting the forces from the tower 20 to the nacelle 10.

The yaw drive device 100 includes a brake unit 160, a motor drive unit 162, and a speed reducing unit 164. The brake unit 160 generates a braking force applied to the output shaft 140. The motor brake unit 160 applies the braking force directly to the output shaft 140, but this is not limitative. It is also possible that the braking force is applied indirectly to the output shaft 140. For example, the force of the motor brake unit 160 may be applied to a member other than the output shaft 140 and then applied to the output shaft 140 from this member. The motor drive unit 162 generates a drive force applied to the output shaft 140. The brake unit 160 generates the braking force by an electromagnetic action in accordance with a control signal provided externally. The brake unit 160 is an electromagnetic brake configured to generate the braking force when supplied with a voltage and generate no braking force when not supplied with a voltage. The brake unit 160 operates as an electromagnetic brake that generates a higher braking force as the supplied electric power is higher. The motor drive unit 162 generates the drive force by an electromagnetic action in accordance with a control signal provided externally. The speed reducing unit 164 reduces the rotation speed according to the drive force generated by the motor drive unit 162 to increase the drive torque. In the embodiment, the drive force and the braking force are generated, but this is not limitative. It is also possible to obtain a braking force by generating a drive force in an opposite direction to the direction of the drive force for rotating the nacelle 10. In such a case, the yaw drive device 100 does not need to include the motor brake unit 160.

Further, the yaw drive device 100 includes a strain sensor 166a and a strain sensor 166b. The strain sensors 166 are an example of an obtaining unit for obtaining information on the load. The strain sensor 166a and the strain sensor 166b may be hereinafter collectively referred to simply as "the strain sensors 166." The strain sensors 166 output a signal in accordance with a strain occurring in the fastening bolts 130. The strain occurring in the fastening bolts 130 changes in accordance with the tangential force. In the embodiment, the strain in the fastening bolts 130 is detected as the information on the load, but this is not limitative. It is also possible to detect a torque occurring between the output shaft 140 and the ring gear 22. In the yaw drive device 100, for example, the torque may be detected by measuring the amount of force acting on the output shaft 140. Further, the yaw drive device 100 may include a torque meter for sensing torsion in the output shaft 140 that connects between the motor drive unit 162 and the motor brake unit 160, such that an output signal from the torque meter can be obtained as information on the load. Further, the yaw drive device 100 may include a strain gauge disposed at the base of a gear such as the pinion gear 150 for transmitting the drive force or the braking force, such that an output signal from the strain gauge can be obtained as information on the load. Further, in the yaw drive device 100, a difference between the output torsion angle of the output shaft 140 and an input torsion angle of the output shaft 140 may be sensed, such that the information indicating the sensed difference can be obtained as information on the load. The output torsion angle of the output shaft 140 is a torsion angle of the output shaft 140 near the motor brake unit 160 or the motor drive unit 162, and the input torsion angle of the output shaft 140 is a torsion angle of the output shaft 140 near the pinion gear 150.

The wind power generation device 1 includes a hydraulic brake for applying a braking force to the ring gear 22. The hydraulic brake is, for example, a caliper brake mechanism. The hydraulic brake includes a hydraulic brake driving unit 52 and a friction member 50. The hydraulic brake driving unit 52 moves the friction member 50 in the Z direction in FIG. 3 in accordance with a control signal provided externally. The hydraulic brake driving unit 52 applies a braking force to the ring gear 22 by urging the friction member 50 against the ring gear 22. The wind power generation device 1 is preferably capable of adjusting the braking force applied to the ring gear 22.

Figure 4:
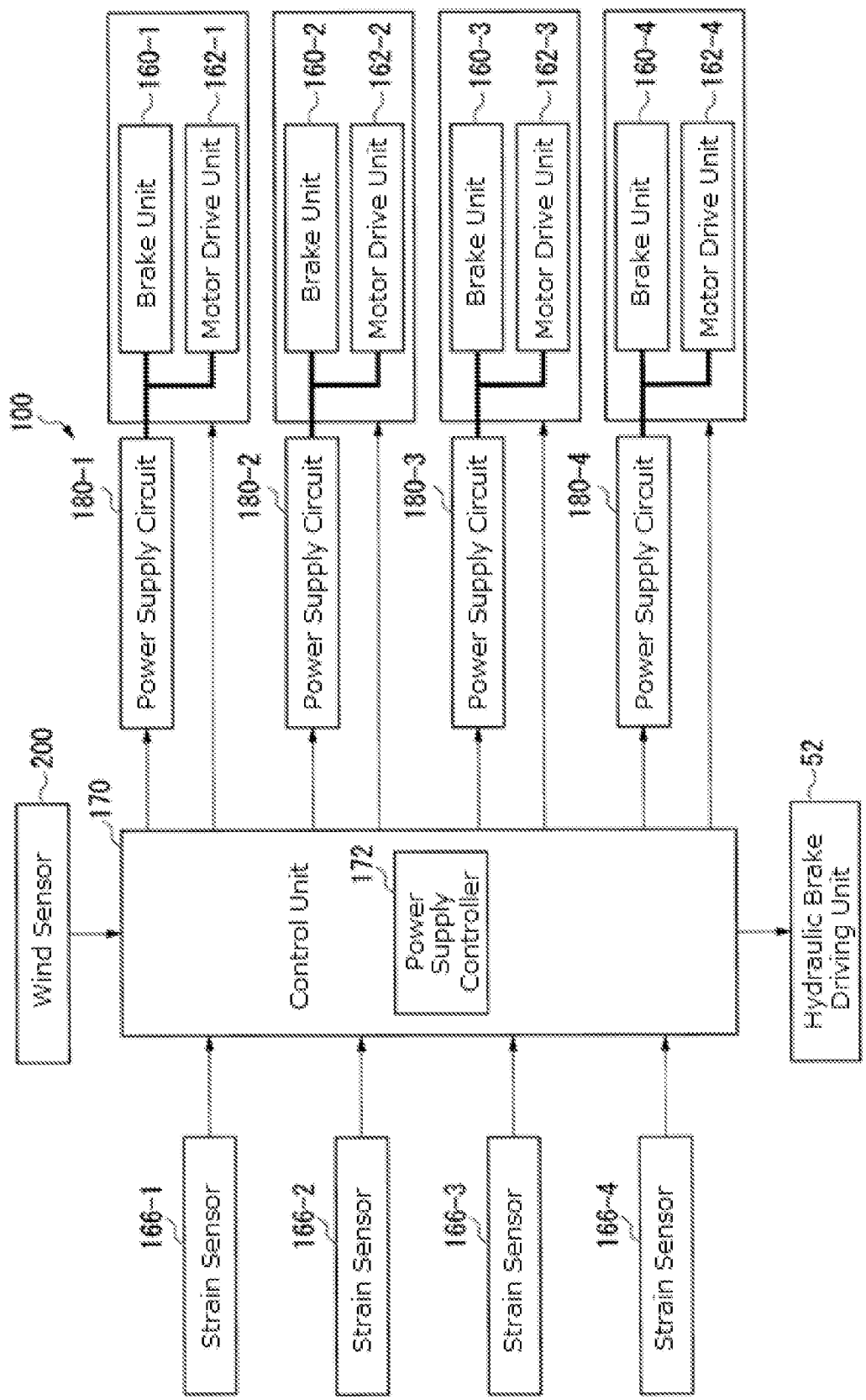
FIG. 4 is a block diagram showing an example of functionality of the wind power generation device according to the embodiment.

FIG. 4 is a block diagram showing an example of functionality of the wind power generation device according to the embodiment. FIG. 4 shows an example of functionality for controlling the yaw drive force in the wind power generation device 1. The wind power generation device 1 includes, for example, a control unit 170, strain sensors 166-1, 166-2, 166-3, 166-4, brake units 160-1, 160-2, 160-3, 160-4, motor drive units 162-1, 162-2, 162-3, 162-4, power supply circuits 180-1, 180-2, 180-3, 180-4, and a hydraulic brake driving unit 52, and a wind sensor 200. The strain sensors 166-1, 166-2, 166-3, 166-4 may be hereinafter collectively referred to simply as "the strain sensors 166." The brake units 160-1, 160-2, 160-3, 160-4 may be hereinafter collectively referred to simply as "the brake units 160." The motor drive units 162-1, 162-2, 162-3, 162-4 may be hereinafter collectively referred to simply as "the motor drive units 162." The power supply circuits 180-1, 180-2, 180-3, 180-4 may be hereinafter collectively referred to simply as "the power supply circuits 180."

The strain sensor 166-1 corresponds to the strain sensor 166a and the strain sensor 166b in the yaw drive device 100-1. The strain sensor 166-2 corresponds to the strain sensor 166a and the strain sensor 166b in the yaw drive device 100-2. The strain sensor 166-3 corresponds to the strain sensor 166a and the strain sensor 166b in the yaw drive device 100-3. The strain sensor 166-4 corresponds to the strain sensor 166a and the strain sensor 166b in the yaw drive device 100-4. Each of the yaw drive devices 100 may include more than two strain sensors 166.

The brake unit 160-1 corresponds to the brake unit 160 in the yaw drive device 100-1. The brake unit 160-2 corresponds to the brake unit 160 in the yaw drive device 100-2. The brake unit 160-3 corresponds to the brake unit 160 in the yaw drive device 100-3. The brake unit 160-4 corresponds to the brake unit 160 in the yaw drive device 100-4. The motor drive unit 162-1 corresponds to the motor drive unit 162 in the yaw drive device 100-1. The motor drive unit 162-2 corresponds to the motor drive unit 162 in the yaw drive device 100-2. The motor drive unit 162-3 corresponds to the motor drive unit 162 in the yaw drive device 100-3. The motor drive unit 162-4 corresponds to the motor drive unit 162 in the yaw drive device 100-4.

The wind sensor 200 is disposed, for example, on the top surface of the nacelle 10. The wind sensor 200 generates a signal (wind sensing signal) that indicates the wind strength and the wind direction and provides this signal to the control unit 170.

The control unit 170 supervises the plurality of yaw drive devices 100. The control unit 170 includes a power supply controller 172. The control unit 170 is formed of, for example, a processor such as a CPU (Central Processing Unit) executing a program stored on a program memory. The control unit 170 may alternatively be formed of hardware such as a LSI (Large Scale Integration), an ASIC (Application Specific Integrated Circuit), or a FPGA (Field-Programmable Gate Array) or formed of software and hardware cooperating with each other. The control unit 170 is an example of the wind turbine drive control device, but alternatively, the control unit 170 and the strain sensors 166 may be an example of the wind turbine drive control device. The control unit 170, the strain sensors 166, and the power supply circuits 180 may be an example of the wind turbine power supply device.

The control unit 170 receives a strain sensing signal from each of the strain sensors 166-1, 166-2, 166-3, and 166-4. The control unit 170 receives a wind sensing signal from the wind sensor 200. The control unit 170 outputs control signals to the brake units 160-1, 160-2, 160-3, 160-4, the motor drive units 162-1, 162-2, 162-3, 162-4, and the hydraulic brake driving unit 52 based on the strain sensing signals and the wind sensing signal. The power supply controller 172 outputs a control signal to each of the power supply circuit 180-1, the power supply circuit 180-2, the power supply circuit 180-3, and the power supply circuit 180-4 based on the strain sensing signals.

Figure 5:
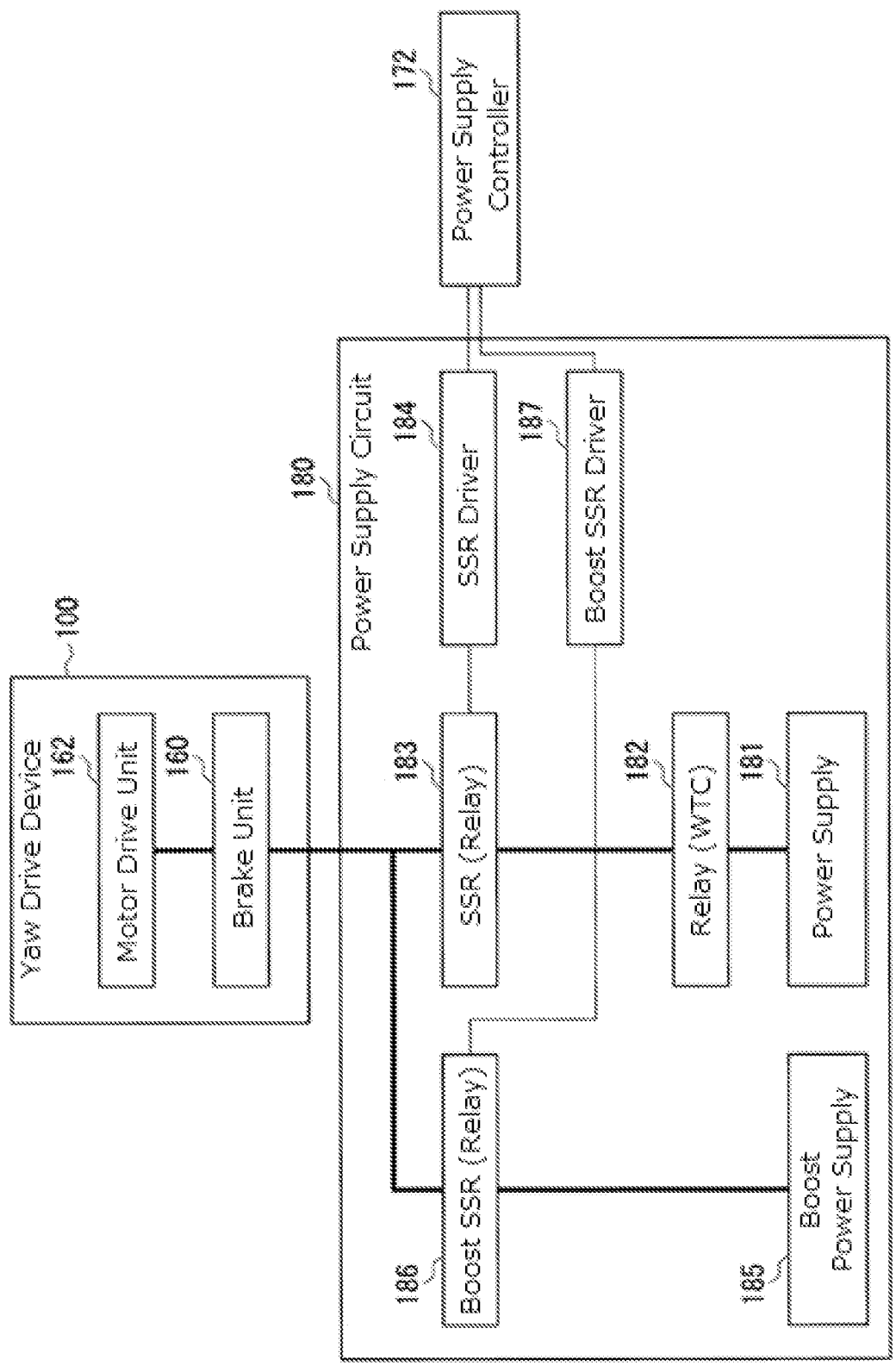
FIG. 5 is a block diagram showing an example of a power supply circuit according to the embodiment.

FIG. 5 is a block diagram showing an example of a power supply circuit 180 according to the embodiment. The power supply circuit 180 includes, for example, a power supply 181, a relay 182, a SSR (Solid State Relay) 183, a SSR driver 184, a boost power supply 185, a boost SSR 186, and a boost driver 187. The power supply circuit 180 shown in FIG. 5 is provided for each of the yaw drive devices 100. In other words, the wind power generation device 1 includes the same number of yaw drive devices 100 and power supply circuits 180. The plurality of power supply circuits 180 are connected to a single power supply controller 172.

The power supply 181 is an example of a first power supply unit that supplies a first electric power to the corresponding yaw drive device 100. The first electric power is used to generate a predetermined braking force determined by dividing the braking force required to fix the nacelle 10 to the tower 20 by the number of yaw drive devices 100. To supply the first electric power to the yaw drive device 100, the power supply 181 supplies, for example, a voltage of 24 V to the yaw drive device 100. The first electric power may be higher than the braking force determined by dividing the braking force required to fix the nacelle 10 to the tower 20 by the number of yaw drive devices 100, and the first electric power changes based on the braking force required to fix the nacelle 10 to the tower 20 and the number of yaw drive devices 100.

The relay 182 is a switch for switching the connection state between the power supply 181 and the SSR 183 between disconnection and continuity. The relay 182 performs switching operation in accordance with the control signal from the power supply controller 172 and a signal from a control unit (not shown). The relay 182 is switched to the continuity (closed) state when the power supply 181 supplies a voltage to the yaw drive device 100, whereas it is switched to the disconnection (open) state when the power supply 181 does not supply a voltage to the yaw drive device 100.

The SSR 183 is an example of an electric power switch formed of a semiconductor device. The SSR driver 184 generates a drive signal for driving the semiconductor device of the SSR 183 based on the control signal from the power supply controller 172. Based on the drive signal supplied from the SSR driver 184, the SSR 183 switches the connection state between the relay 182 and the yaw drive device 100 between disconnection and continuity. The SSR 183 is switched to the continuity (closed) state so as to cause the yaw drive device 100 to generate an ordinary braking force, whereas it is switched to the disconnection (open) state so as not to cause the yaw drive device 100 to generate an ordinary braking force.

The boost power supply 185 is an example of a second power supply unit that supplies a second electric power higher than the first electric power to the corresponding yaw drive device 100. When the braking force of a part of the yaw drive devices 100 is reduced, the second electric power is used to generate a braking force determined by dividing the braking force required of the other yaw drive devices 100 by the number of the other yaw drive devices 100. To supply the second electric power to the yaw drive device 100, the boost power supply 185 supplies, for example, a voltage of 35 V to the yaw drive device 100.

The boost SSR 186 is an example of an electric power switch formed of a semiconductor device. The boost driver 187 generates a drive signal for driving the semiconductor device of the boost SSR 186 based on the control signal from the power supply controller 172. Based on the drive signal supplied from the boost driver 187, the boost SSR 186 switches the connection state between the boost power supply 185 and the yaw drive device 100 between disconnection and continuity.

In the power supply circuit 180, the voltage source is switched between the power supply 181 and the boost power supply 185 to switch the voltage value supplied to the corresponding yaw drive device 100, but this configuration is not limitative. The power supply circuit 180 may have any configuration in which the electric power is switched. For example, the power supply circuit 180 may switch the electric power by controlling the duty ratio of the voltage supplied to the yaw drive device 100.

Figure 6:
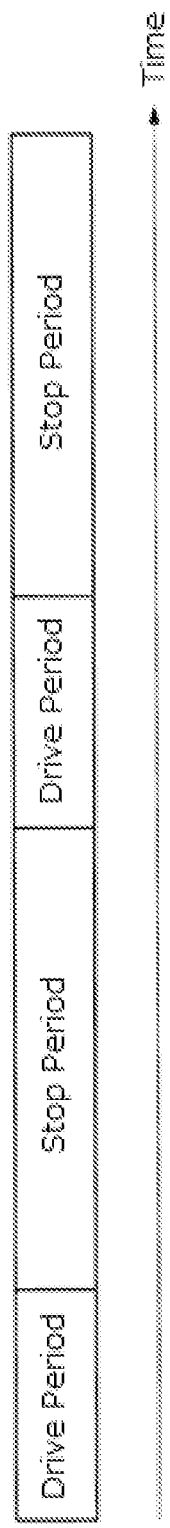
FIG. 6 shows periods of control according to the embodiment.

FIG. 6 shows periods of control according to the embodiment. As shown in FIG. 6 for example, the control unit 170 previously sets a drive period and a stop period. In the drive period, the orientation of the nacelle 10 is moved based on the direction of wind received by the wind power generation device 1. In the stop period, the orientation of the nacelle 10 is fixed. The control unit 170 performs control for moving the nacelle 10 to a target position relative to the tower 20 during the drive period. The control unit 170 performs control for stopping the nacelle 10 at a target position relative to the tower 20 during the stop period. The control for stopping the nacelle 10 at a target position relative to the tower 20 is accomplished by controlling the power supply circuits 180 to supply the first electric power to the plurality of yaw drive devices 100. The target position is the optimal position of the nacelle 10 relative to the tower 20 determined based on the wind direction.

At the timing of starting the drive period, the control unit 170 starts control for moving the nacelle 10 to the target position relative to the tower 20. The control unit 170 positions the nacelle 10 at the target position by the timing of ending the drive period. The control unit 170 generates the braking force so as to fix the nacelle 10 at the target position during the stop period. In this way, the control unit 170 switches the control between the drive period and the stop period. By way of an example, the drive period is several minutes, and the stop period is ten-odd minutes. For higher efficiency in power generation, it is preferable that the orientation of the wind power generation device 1 can be changed to follow the change in the wind direction. Further, if the wind power generation device 1 includes a wind direction sensor, it is possible that the stop period is ended and the drive period is started when an accumulated change of the wind direction exceeds a predetermined angle. Still further, the drive period and the stop period may be adjusted in accordance with the characteristics of the district where the power generation device 1 is situated. Yet further, the period in which the braking force of the electromagnetic brake is temporarily reduced is a period enough to securely reduce the load and thus may be as short as, for example, several micro seconds. In addition, the period in which the voltage is off, which corresponds to the period in which the braking force of the electromagnetic brake is reduced, may be several micro seconds and may also be changed based on the sensing value of the corresponding strain sensor 166.

Figure 7:
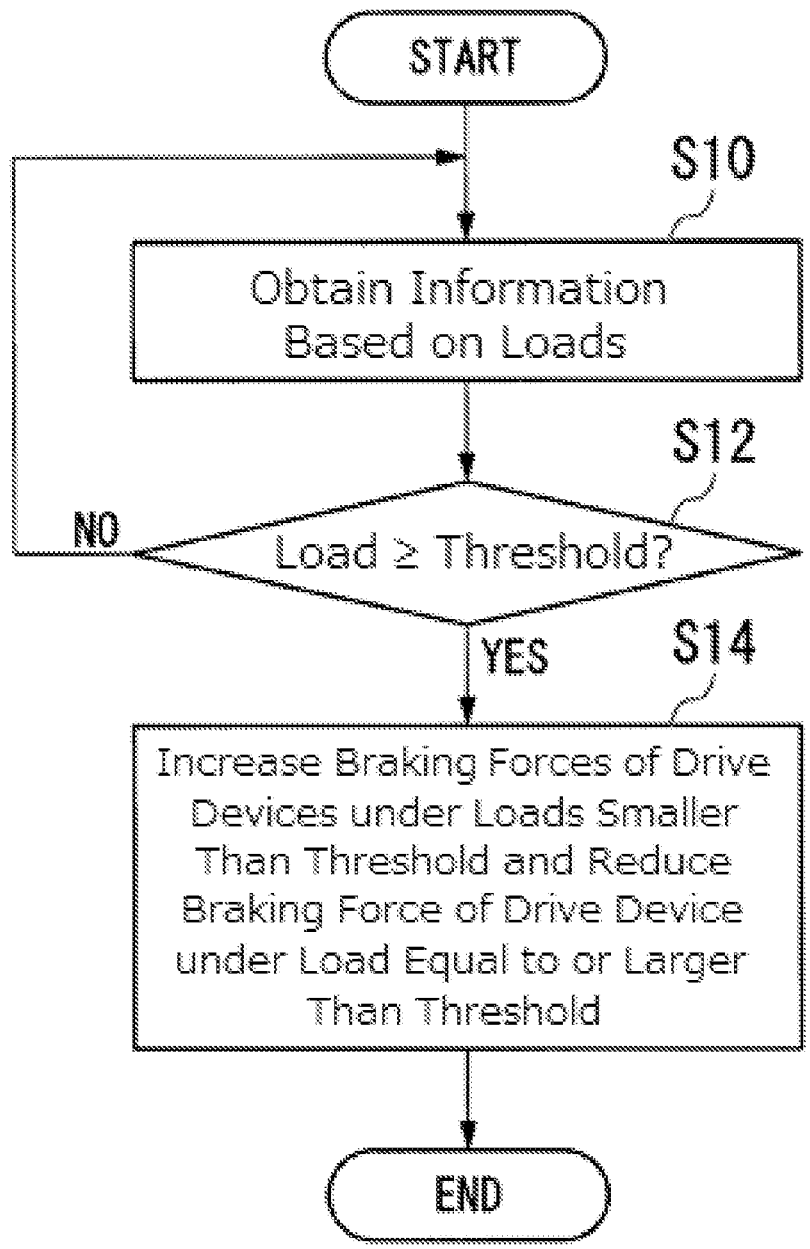
FIG. 7 is a flowchart showing an example of operation for approximately uniforming the load according to the embodiment.

The following describes an operation for approximately uniforming the load among the plurality of yaw drive devices 100. FIG. 7 is a flowchart showing an example of operation for approximately uniforming the load according to the embodiment. The operation shown in FIG. 7 is repeated at predetermined intervals during the stop period.

The control unit 170 first obtains information on the load from each of the strain sensors 166-1, 166-2, 166-3, 166-4 (step S10). For each item of the information on the load, the control unit 170 determines whether the load is equal to or larger than a threshold value (step S12). If the control unit 170 does not determine that the load is equal to or larger than the threshold value (No in step S12), the control unit 170 repeats step S10. If the load is equal to or larger than the threshold value (Yes in step S12), the control unit 170 causes the yaw drive devices 100 under loads smaller than the threshold value to increase the braking forces thereof and causes the yaw drive device 100 under a load equal to or larger than the threshold value to reduce the braking force thereof (step S14). The yaw drive devices 100 under loads smaller than the threshold value are an example of first drive devices, and the yaw drive device 100 under a load equal to or larger than the threshold value is an example of a second drive device.

Figure 8:
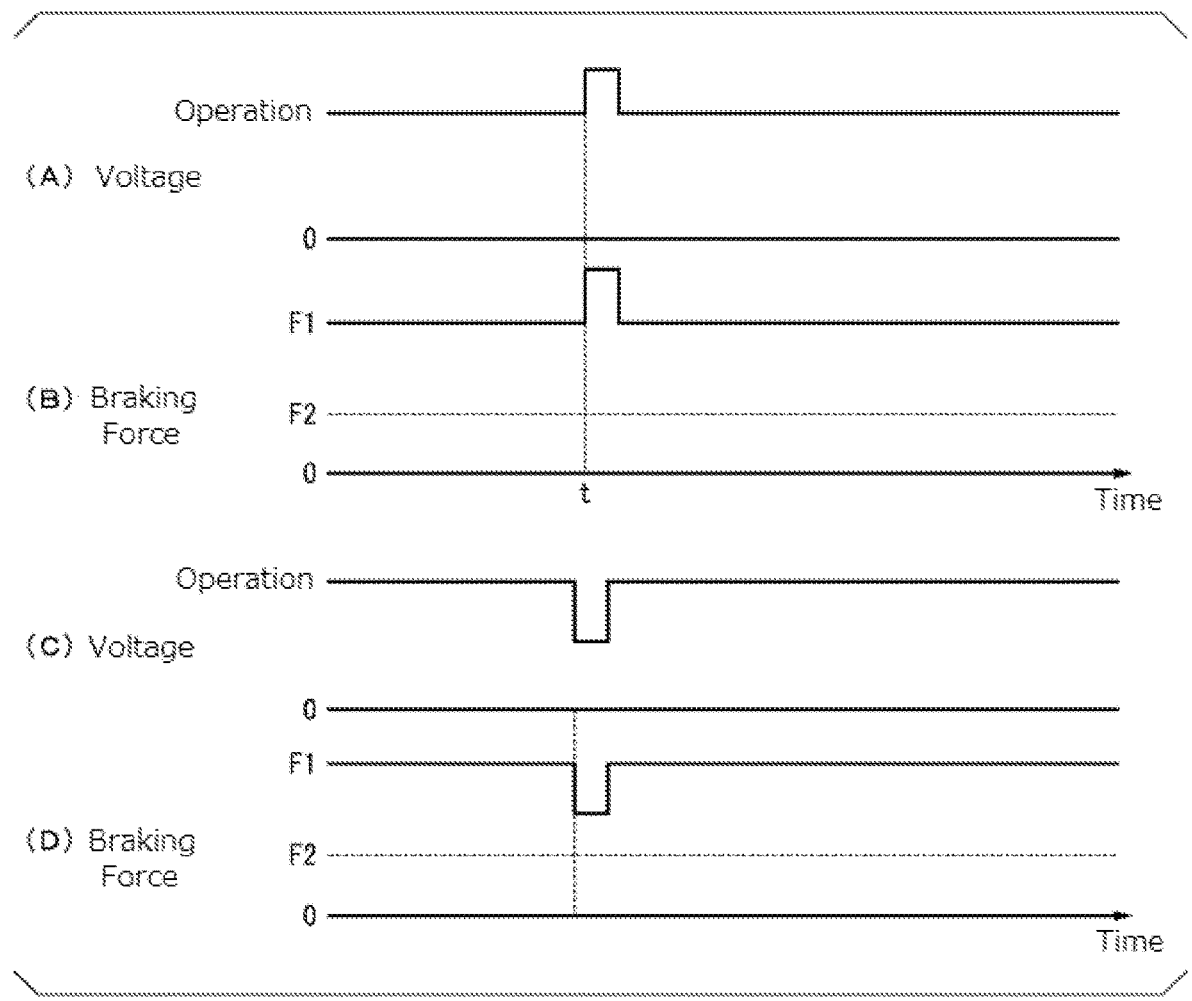
FIG. 8 shows an example of operation for controlling the braking force and the voltage according to the embodiment. Part (A) of FIG. 8 shows a change in the voltage supplied to the brake unit 160 of the yaw drive device under a load smaller than a threshold value. Part (B) of FIG. 8 shows a change in the braking force of the yaw drive device under a load smaller than the threshold value. Part (C) of FIG. 8 shows a change in the voltage supplied to the brake unit 160 of the yaw drive device under a load equal to or larger than the threshold value. Part (D) of FIG. 8 shows a change in the braking force of the yaw drive device under a load equal to or larger than the threshold value.

FIG. 8 shows an example of operation for controlling the voltage and the braking force according to the embodiment. Part (A) of FIG. 8 shows a change in the voltage supplied to the brake unit 160 of the yaw drive device 100 under a load smaller than the threshold value. Part (B) of FIG. 8 shows a change in the braking force of the yaw drive device 100 under a load smaller than the threshold value. Part (C) of FIG. 8 shows a change in the voltage supplied to the brake unit 160 of the yaw drive device 100 under a load equal to or larger than the threshold value. Part (D) of FIG. 8 shows a change in the braking force of the yaw drive device 100 under a load equal to or larger than the threshold value.

Suppose that, in the wind power generation device 1, the ring gear 22 receives a braking force F1 that is a sum of the braking forces provided by the brake units 160 (electromagnetic brakes) and the braking force provided by the friction member 50 during the stop period, for example.

When it is determined that the load on the yaw drive device 100-1 is equal to or larger than the threshold value and the loads on the yaw drive devices 100-2 to 100-4 are smaller than the threshold value, the control unit 170 increases the voltage supplied to the yaw drive devices 100-2 to 100-4, as shown in Part (A) of FIG. 8, to temporarily increase the braking forces of the electromagnetic brakes of the yaw drive devices 100-2 to 100-4, as shown in Part (B) of FIG. 8, and the control unit 170 also reduces the voltage supplied to the yaw drive device 100-1, as shown in Part (C) of FIG. 8, to temporarily reduce the braking force of the electromagnetic brake of the yaw drive device 100-1, as shown in Part (D) of FIG. 8, As a result, when the braking force of the yaw drive device 100-1 is lower than the force between the pinion gear 150 and the ring gear 22, the pinion gear 150 rotates in the direction for a smaller load. Thus, the load after rotation of the pinion gear 150 falls below the load before reduction of the braking force of the electromagnetic brake. The "reduction of the braking force" encompasses setting the braking force at zero, in addition to reducing the braking force of the electromagnetic brake.

Figure 9:
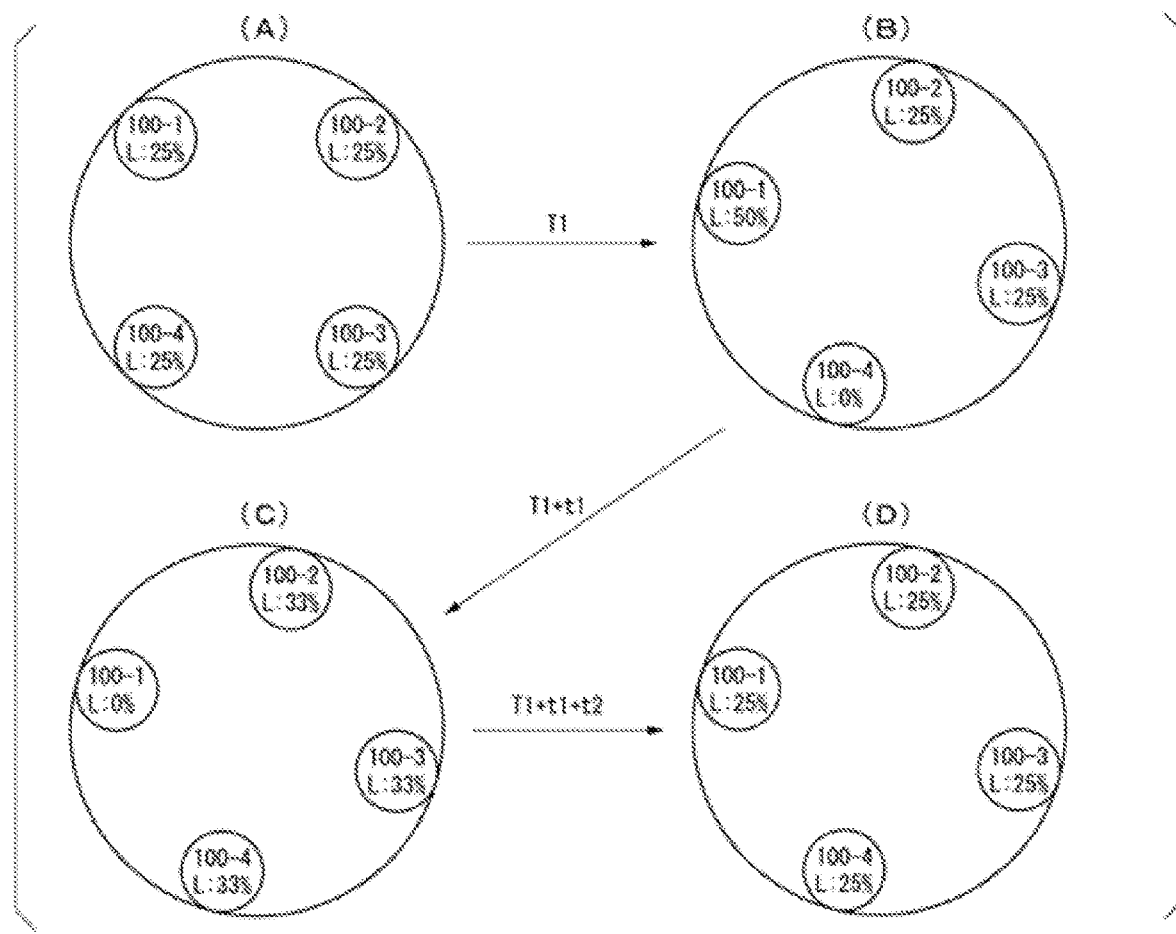
FIG. 9 shows a change in the load in each of a plurality of yaw drive devices according to the embodiment.

FIG. 9 shows a change in the load in each of a plurality of yaw drive devices 100 according to the embodiment. FIG. 9 shows the loads (L) distributed to the four yaw drive devices 100 that total 100%.

As shown in Part (A) of FIG. 9, suppose that each of the yaw drive devices 100-1, 100-2, 100-3, and 100-4 is under a load of 25%. In this state, the entire load on the wind power generation device 1 is evenly distributed to the four yaw drive devices 100. After the period T1, as shown in Part (B) of FIG. 9, the load on the yaw drive device 100-4 has changed to 0%, and the load on the yaw drive device 100-1 has changed to 50%. In this case, the control unit 170 determines that the load on the yaw drive device 100-1 is equal to or larger than the threshold value, and at the timing of T1+t1, the control unit 170 increases the braking forces of the yaw drive devices 100-2 to 100-4 and then reduces the braking force of the yaw drive device 100-1. The control unit 170 may simultaneously increase the braking forces of the yaw drive devices 100-2 to 100-4 and reduce the braking force of the yaw drive device 100-1. Thus, as shown in Part (C) of FIG. 9, the load on the yaw drive device 100-1 is changed to 0%, and the loads on the other yaw drive devices 100-2, 100-3, 100-4 are changed to 33%. In this way, the variation of the loads among the yaw drive devices 100 can be reduced from the state after the period T1 in which the highest load is 50% and the lowest load is 0% to the state in which the highest load is 33% and the lowest load is 0%.

The braking forces of the four yaw drive devices 100 are then controlled to be uniform. The control unit 170 may first cause the yaw drive device 100-1 to generate one-fourth of the entire braking force necessary for the wind power generation device 1, and then control the braking forces of the yaw drive devices 100-2, 100-3, 100-4 to be one-fourth of the entire braking force necessary for the wind power generation device 1. Alternatively, the control unit 170 may simultaneously control the braking forces of the four yaw drive devices 100 to be one-fourth of the entire braking force necessary for the wind power generation device 1. Thus, as shown in Part (D) of FIG. 9, each of the loads on the yaw drive devices 100-1, 100-2, 100-3, and 100-4 can be approximated to 25% at the timing of T1+t1+t2. As a result, the variation of the loads among the yaw drive devices 100 can be further inhibited.

Figure 10:
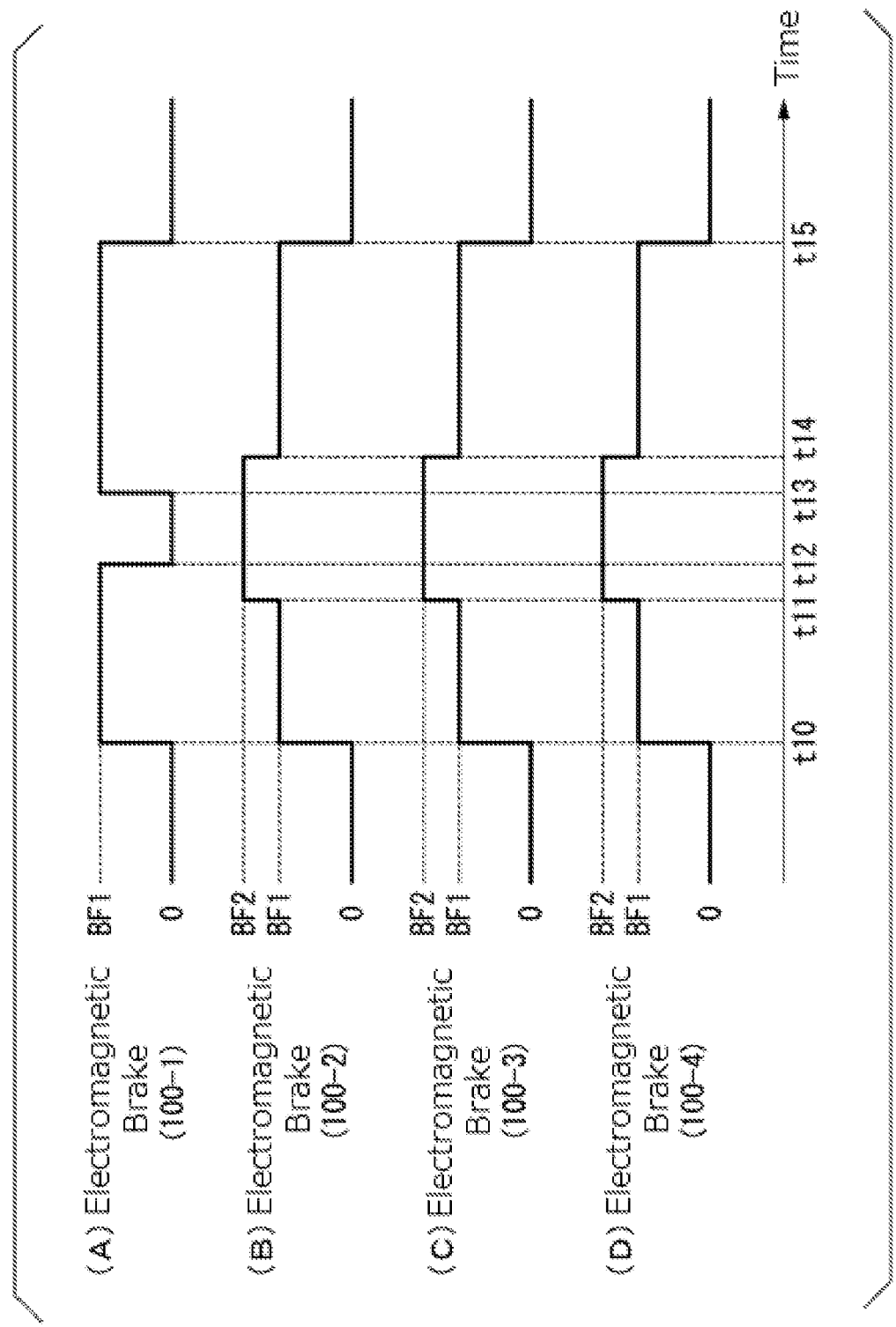
FIG. 10 shows an example of operation for controlling the braking forces of four electromagnetic brakes according to the embodiment. Part (A) of FIG. 10 shows a change in the braking force of the yaw drive device 100-1. Part (B) of FIG. 10 shows a change in the braking force of the yaw drive device 100-2. Part (C) of FIG. 10 shows a change in the braking force of the yaw drive device 100-3. Part (D) of FIG. 10 shows a change in the braking force of the yaw drive device 100-4.

FIG. 10 shows an example of operation for controlling the braking forces of four electromagnetic brakes according to the embodiment. Part (A) of FIG. 10 shows a change in the braking force of the yaw drive device 100-1. Part (B) of FIG. 10 shows a change in the braking force of the yaw drive device 100-2. Part (C) of FIG. 10 shows a change in the braking force of the yaw drive device 100-3. Part (D) of FIG. 10 shows a change in the braking force of the yaw drive device 100-4.

When the stop period starts at time t10 for example, each of the four yaw drive devices 100 generates a braking force BF1 by the electromagnetic brake thereof. Following that, when it is detected that the load on the yaw drive device 100-1 is equal to or larger than the threshold value, the braking forces of the electromagnetic brakes of the yaw drive devices 100-2, 100-3, and 100-4 are increased from BF1 to BF2 at time t11. Then at time t12, the braking force of the electromagnetic brake of the yaw drive device 100-1 is reduced, and after a predetermined period, at time t13, the braking force of the electromagnetic brake of the yaw drive device 100-1 is brought back to BF1. The predetermined period is long enough to reduce the load on the yaw drive device 100-1. Following that, at time t14, the braking forces of the electromagnetic brakes of the yaw drive devices 100-2, 100-3, and 100-4 are reduced from BF2 to BF1. When the stop period ends at time t15, the braking forces of the four yaw drive devices 100 are reduced to zero by the electromagnetic brakes. It was described above that the braking forces of the electromagnetic brakes are increased in the yaw drive devices 100-2, 100-3, and 100-4 as the first drive devices. It is also possible that, for example, the braking forces are increased only in the yaw drive devices 100-2 and 100-3. In this way, the braking force is increased in at least one of the first drive devices other than the yaw drive device 100-1.

Figure 11:
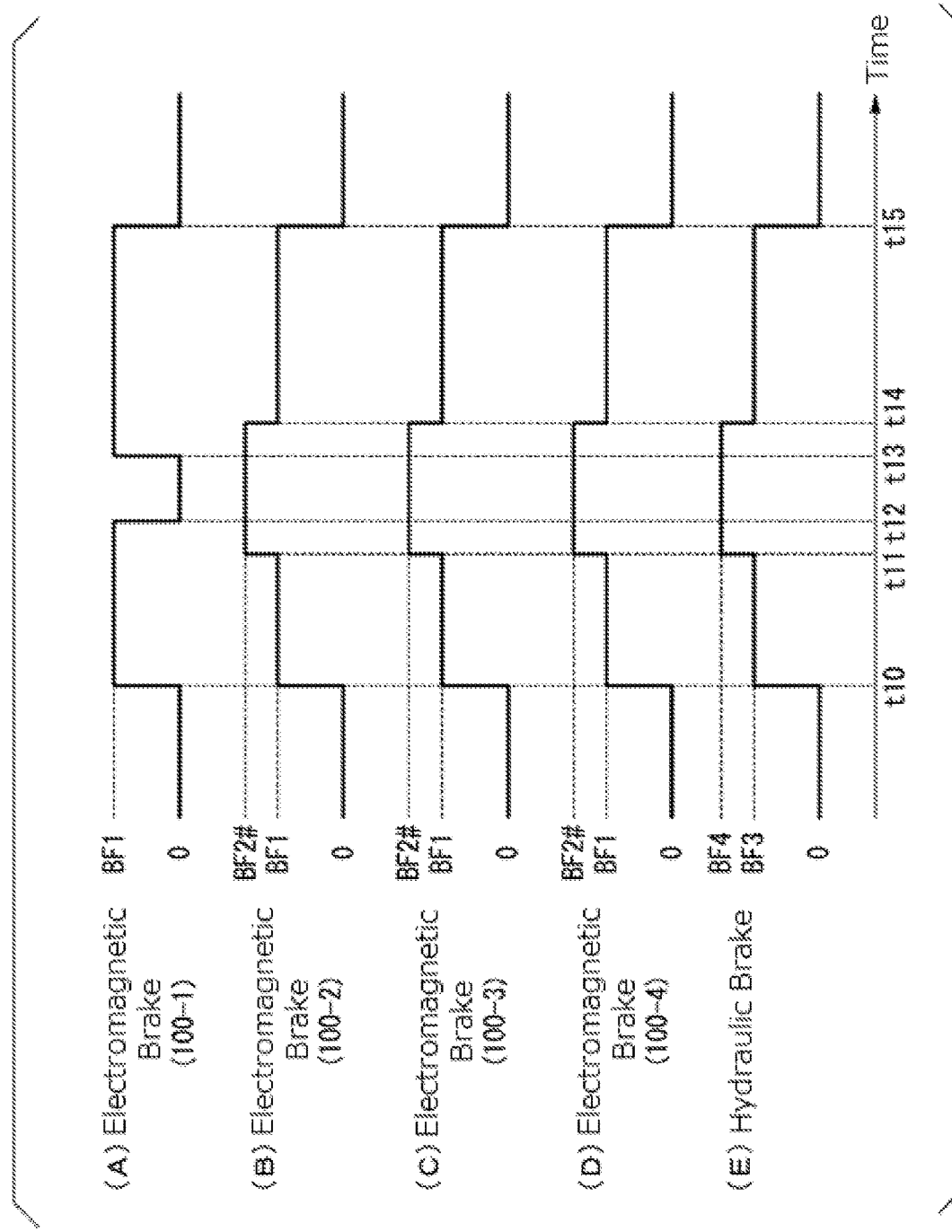
FIG. 11 shows an example of operation for controlling the braking forces of four electromagnetic brakes according to the embodiment. Part (A) of FIG. 11 shows a change in the braking force of the yaw drive device 100-1. Part (B) of FIG. 11 shows a change in the braking force of the yaw drive device 100-2. Part (C) of FIG. 11 shows a change in the braking force of the yaw drive device 100-3. Part (D) of FIG. 11 shows a change in the braking force of the yaw drive device 100-4. Part (E) of FIG. 11 shows a change in the braking force of a hydraulic brake.

FIG. 11 shows an example of operation for controlling the braking forces of four electromagnetic brakes according to the embodiment. Part (A) of FIG. 11 shows a change in the braking force of the yaw drive device 100-1. Part (B) of FIG. 11 shows a change in the braking force of the yaw drive device 100-2. Part (C) of FIG. 11 shows a change in the braking force of the yaw drive device 100-3. Part (D) of FIG. 11 shows a change in the braking force of the yaw drive device 100-4. Part (E) of FIG. 11 shows a change in the braking force of a hydraulic brake.

When the stop period starts at time t10, the hydraulic brake generates a braking force BF3, and each of the four yaw drive devices 100 generates the braking force BF1 by the electromagnetic brake thereof. Following that, when it is detected that the load on the yaw drive device 100-1 is equal to or larger than the threshold value, the braking force of the hydraulic brake is increased from BF3 to BF4, and the braking forces of the electromagnetic brakes of the yaw drive devices 100-2, 100-3, and 100-4 are increased from BF1 to BF2 at time t11. Then at time t12, the braking force of the electromagnetic brake of the yaw drive device 100-1 is reduced, and after a predetermined period, at time t13, the braking force of the electromagnetic brake of the yaw drive device 100-1 is brought back to BF1. Following that, at time t14, the braking force of the hydraulic brake is reduced from BF4 to BF3, and the braking forces of the electromagnetic brakes of the yaw drive devices 100-2, 100-3, and 100-4 are reduced from BF2 to BF1. When the stop period ends at time t15, the braking force of the hydraulic brake is reduced to zero, and the braking forces of the four yaw drive devices 100 are reduced to zero by the electromagnetic brakes.

Advantageous Effects of the Embodiment

A wind turbine drive control device according to the embodiment described above is a wind turbine drive control device for controlling a plurality of yaw drive devices 100 for moving two structures (the nacelle 10 and the tower 20) included in a wind power generation device 1 relative to each other, the wind turbine drive control device comprising: an obtaining unit 166 for obtaining a plurality of information items related to loads occurring between each of the plurality of yaw drive devices 100 and one of the two structures that receives forces generated by the plurality of yaw drive devices 100; and a control unit 170 for controlling the plurality of yaw drive devices 100 in such a manner that, in a state where each of the plurality of yaw drive devices 100 is controlled to generate a predetermined braking force, the braking force of at least one yaw drive device 100 among the plurality of yaw drive devices 100 is increased, based on the plurality of information items obtained by the obtaining unit 166. With this embodiment, the braking force of at least one yaw drive device 100 among the plurality of yaw drive devices 100 can be increased. Therefore, the braking force of the yaw drive device 100 under a high load can be reduced to inhibit the variation of the loads among the yaw drive devices 100. As a result, it is possible to facilitate inhibiting the variation of the loads among the yaw drive devices 100. That is, with this embodiment, the braking force of the yaw drive devices 100 can be increased. Therefore, deficiency of the braking force for the entire wind power generation device 1 can be inhibited even when the braking force of one yaw drive device 100 is reduced to inhibit the variation of the loads among the yaw drive devices 100.

In the wind power generation device 1 according to the embodiment, the nacelle 10 is preferably positioned relative to the tower 20 such that the loads on the plurality of yaw drive devices 100 are even, in view of the life of the wind power generation device 1. However, the loads may be uneven between the yaw drive devices 100 due to the mechanical accuracy and rigidity of the output shaft 140 and the pinion gear 150 in the yaw drive devices 100 and the ring gear 22. Also, in the wind power generation device 1 according to the embodiment, the plurality of yaw drive devices 100 are arranged relative to the turning axis of the nacelle 10 such that the load is distributed. However, the loads may actually be uneven between the yaw drive devices 100 due to the part shapes and the accuracy in mounting the parts of the yaw drive devices 100 and other components. Further, a larger number of yaw drive devices 100 are installed as the wind power generation device 1 is recently designed to be larger. This increases the importance of inhibiting the excess load on the yaw drive devices 100 and uniforming the load among the yaw drive devices 100. According to the embodiment, such a challenge is addressed by increasing the braking force of a yaw drive device 100 and reducing the braking force of another yaw drive device 100, so as to distribute the excess load and approximately uniform the load among the plurality of yaw drive devices 100.

As a result, according to the embodiment, it is possible to inhibit shortening of the life of the wind power generation device 1. Further, according to the embodiment, it is possible to inhibit shortening of the operating time due to damage of the yaw drive devices 100.

A wind turbine drive control device according to the embodiment is a wind turbine drive control device for controlling a plurality of yaw drive devices 100 for moving two structures included in a wind power generation device 1 relative to each other, the wind turbine drive control device comprising: an obtaining unit 166 for obtaining a plurality of information items related to loads occurring between each of the plurality of yaw drive devices 100 and one of the two structures that receives forces generated by the plurality of yaw drive devices 100; and a control unit 170 for controlling the plurality of yaw drive devices 100 in such a manner that, in a state where each of the plurality of yaw drive devices 100 is controlled to generate a predetermined braking force, the braking force of at least one yaw drive device 100 among the plurality of yaw drive devices 100 is increased and the braking force of a yaw drive device 100 other than the at least one yaw drive device 100 is reduced, based on the plurality of information items obtained by the obtaining unit 166. With this embodiment, the braking force of at least one yaw drive device 100 among the plurality of yaw drive devices 100 can be increased, and the braking force of a yaw drive device 100 other than the at least one yaw drive device 100 can be reduced. Therefore, it is possible to inhibit the variation of the loads among the yaw drive devices 100.

A wind turbine power supply device according to the embodiment is a wind turbine power supply device for supplying an electric power to a plurality of yaw drive devices 100 for moving two structures included in a wind power generation device 1 relative to each other, each of the plurality of yaw drive devices 100 including a motor brake unit 160 that generates a higher braking force as supplied with a higher electric power, the wind turbine power supply device comprising: a power supply circuit 180 for supplying an electric power to each of the plurality of yaw drive devices 100; an obtaining unit 166 for obtaining a plurality of information items related to loads occurring between each of the plurality of yaw drive devices 100 and one of the two structures that receives forces generated by the plurality of yaw drive devices 100; and a power supply controller 172 for controlling the power supply circuit 180 in such a manner that, in a state where the power supply circuit 180 is controlled to supply a predetermined electric power to each of the plurality of yaw drive devices 100, the electric power supplied to the motor brake unit 160 of at least one yaw drive device 100 among the plurality of yaw drive devices 100 is increased, based on the plurality of information items obtained by the obtaining unit 166. With this embodiment, the electric power supplied to the motor brake unit of at least one yaw drive device 100 among the plurality of yaw drive devices 100 can be increased. Therefore, the braking force of the yaw drive device 100 under a high load can be reduced to inhibit the variation of the loads among the yaw drive devices 100. As a result, it is possible to facilitate inhibiting the variation of the loads among the yaw drive devices 100. That is, with this embodiment, the braking force of the yaw drive devices 100 can be increased. Therefore, deficiency of the braking force for the entire wind power generation device 1 can be inhibited even when the braking force of one yaw drive device 100 is reduced to inhibit the variation of the loads among the yaw drive devices 100.

A wind turbine power supply device according to the embodiment is a wind turbine power supply device for supplying an electric power to a plurality of yaw drive devices 100 for moving two structures included in a wind power generation device 1 relative to each other, each of the plurality of yaw drive devices 100 including a motor brake unit 160 that generates a higher braking force as supplied with a higher electric power, the wind turbine power supply device comprising: a power supply circuit 180 for supplying an electric power to each of the plurality of yaw drive devices 100; an obtaining unit 166 for obtaining a plurality of information items related to loads occurring between each of the plurality of yaw drive devices 100 and one of the two structures that receives forces generated by the plurality of yaw drive devices 100; and a power supply controller 172 for controlling the power supply circuit 180 in such a manner that, in a state where the power supply circuit 180 is controlled to supply a predetermined electric power to each of the plurality of yaw drive devices 100, the electric power supplied to at least one first yaw drive device 100 among the plurality of yaw drive devices 100 is increased and the electric power supplied to a second yaw drive device 100 other than the at least one first yaw drive device 100 is reduced, based on the plurality of information items obtained by the obtaining unit 166. With this embodiment, the braking force of at least one yaw drive device 100 among the plurality of yaw drive devices 100 can be increased, and the braking force of a yaw drive device 100 other than the at least one yaw drive device 100 can be reduced. Therefore, it is possible to inhibit the variation of the loads among the yaw drive devices 100.

According to the embodiment, a wind power generation device 1 is provided that comprises: a plurality of yaw drive devices 100 each including a motor brake unit 160, a motor drive unit 162, and an output shaft 140 and a pinion gear 150, the motor brake unit 160 being configured to generate a braking force for stopping a second structure 10 relative to a first structure 20, both the first and second structures being included in the wind power generation device 1, the motor brake unit 160 being further configured to generate a higher braking force as supplied with a higher electric power, the motor drive unit 162 being configured to generate a drive force for moving the second structure 10 relative to the first structure 20, the output shaft 140 and the pinion gear 150 being configured to transmit the braking force and the drive force to the first structure 20; a power supply 181 for supplying a first electric power to the motor brake unit 160 of each of the plurality of yaw drive devices 100; a boost power supply 185 for supplying a second electric power to the motor brake unit 160 of each of the plurality of yaw drive devices 100, the second electric power being higher than the first electric power; a switching unit (183, 186) for switching between a state in which the first electric power is supplied from the power supply 181 to the plurality of yaw drive devices 100 and a state in which the second electric power is supplied from the boost power supply 185 to the plurality of yaw drive devices 100; a strain sensor 166 for obtaining a plurality of information items related to loads occurring between each of the plurality of yaw drive devices 100 and one of the two structures that receives forces generated by the plurality of yaw drive devices 100; and a control unit 172 for controlling the plurality of yaw drive devices 100 in such a manner that, in a state where a power supply circuit 180 is controlled to supply a predetermined electric power to each of the plurality of yaw drive devices 100 so as to control the plurality of yaw drive devices 100 such that each of the plurality of yaw drive devices 100 generates a predetermined braking force, the switching unit (183, 186) is controlled to cause the electric power supplied to at least one first yaw drive device 100 among the plurality of yaw drive devices 100 to be increased and cause the electric power supplied to a second yaw drive device 100 other than the at least one first yaw drive device 100 to be reduced, based on the plurality of information items obtained by the strain sensor 166, thereby increasing the braking force of the at least one first yaw drive device 100 among the plurality of yaw drive devices 100 and reducing the braking force of the second yaw drive device 100 other than the at least one first yaw drive device 100. With this embodiment, the electric power supplied to at least one yaw drive device 100 among the plurality of yaw drive devices 100 can be increased, and the electric power supplied to a yaw drive device 100 other than the at least one yaw drive device 100 can be reduced. Therefore, it is possible to inhibit the variation of the loads among the yaw drive devices 100.

The functions of the control unit 170 according to the embodiment described above may be implemented in a program stored on a computer-readable storage medium, and the program stored on the storage medium may be loaded onto a computer system that then executes the program for processing. The "computer system" mentioned above may include an operating system (OS) or hardware such as peripheral devices. The "computer-readable storage medium" mentioned above refers to a storage device such as a portable medium like a flexible disc, a magneto-optical disc, a ROM (Read Only Memory), a flash memory or other writable non-volatile memory, and a DVD (Digital Versatile Disc), and a hard disk built-in to the computer system.

Further, the "computer-readable storage medium" includes storage media that retain the program for some period of time, like a volatile memory (for example, DRAM (Dynamic Random Access Memory)) in an information processing device receiving the program through a network such as the Internet or a communication line such as a telephone line, and a computer system that operates as a client. The computer program mentioned above may be transmitted from a computer system that includes a storage device or the like storing the program to another computer system through a transmission medium or by a transmission wave in a transmission medium. The "transmission medium" for transmitting the program refers to a medium that operates to transmit information, like a network (communication network) such as the Internet or a communication line (communication wire) such as the telephone line. Only a part of the functions described above may be implemented in the above program. Further, the functions described above may be implemented by a combination of the above program and programs previously stored on the computer system. That is, the above program may be what is called a difference file (a difference program). The foregoing is the description of the embodiments of the present invention with reference to the drawings. Specific configurations are not limited to the above embodiments but include design modifications within the purport of the present invention.

What is claimed is:

1. A wind turbine drive control device for controlling a plurality of drive devices for moving two structures included in a wind power generation device relative to each other, the wind turbine drive control device comprising:
    a sensor configured to obtain a plurality of information items related to loads occurring between each of the plurality of drive devices and one of the two structures that receives forces generated by the plurality of drive devices; and
    control circuitry configured to control the plurality of drive devices based on the plurality of information items,
    wherein in a case that at least one drive device of the plurality of drive devices is under a load equal to or greater than a threshold value in a state where each of the plurality of drive devices is controlled to generate a first predetermined braking force, the control circuitry is configured to control the plurality of drive devices to temporarily reduce each braking force of the at least one drive device, while temporarily increasing each braking force of other drive devices than the at least one drive device, which are under a load smaller than the threshold value.

2. A wind turbine power supply device for supplying an electric power to a plurality of drive devices for moving two structures included in a wind power generation device relative to each other, the wind turbine power supply device comprising:
    a power supply circuit configured to supply an electric power to each of the plurality of drive devices, each of the plurality of drive devices including a brake unit configured to generate a higher braking force as supplied with a higher electric power;
    a sensor configured to obtain a plurality of information items related to loads occurring between each of the plurality of drive devices and one of the two structures that receives forces generated by the plurality of drive devices; and
    control circuitry configured to control the power supply circuit based on the plurality of information items,
    wherein in a case that at least one drive device of the plurality of drive devices is under a load equal to or greater than a threshold value in a state where the power supply circuit is controlled to supply a first predetermined electric power to each of the plurality of drive devices, the control circuitry is configured to control the power supply circuit to temporarily reduce the electric power supplied to each brake unit of the at least one drive device, while temporarily increasing the electric power supplied to each brake unit of other drive devices than the at least one drive device, which are under a load smaller than the threshold value.

3. A wind power generation device comprising:
a plurality of drive devices each including a brake unit, a drive unit, and a transmission unit, the brake unit being configured to generate a braking force for stopping a second structure relative to a first structure, both the first and second structures being included in the wind power generation device, the brake unit being further configured to generate a higher braking force as supplied with a higher electric power, the drive unit being configured to generate a drive force for moving the second structure relative to the first structure, the transmission unit being configured to transmit the braking force and the drive force to the first structure;
a first power supply unit configured to supply a first electric power to the brake unit of each of the plurality of drive devices;
a second power supply unit configured to supply a second electric power to the brake unit of each of the plurality of drive devices, the second electric power being higher than the first electric power;
a switch configured to switch between a state in which the first electric power is supplied from the first power supply unit to the plurality of drive devices and a state in which the second electric power is supplied from the second power supply unit to the plurality of drive devices;
a sensor configured to obtain a plurality of information items related to loads occurring between each of the plurality of drive devices and one of the two structures that receives forces generated by the plurality of drive devices; and
control circuitry configured to control the plurality of drive devices based on the plurality of information items,
wherein in a case that at least one drive device of the plurality of drive devices is under a load equal to or greater than a threshold value in a state where the first and second power supply units are controlled to supply a first predetermined electric power to each of the plurality of drive devices so as to control each of the plurality of drive devices to generate a first predetermined braking force, the control circuitry is configured to control the switch to temporarily reduce an electric power supplied to each brake unit of the at least one drive device, while temporarily increasing an electric power supplied to each brake unit of other drive devices than the at least one drive device, which are under a load smaller than the threshold value, thereby temporarily reducing each braking force of the at least one drive device, while temporarily increasing each braking force of the other drive devices.

4. A method of controlling a wind turbine drive control device for controlling a plurality of drive devices for moving two structures included in a wind power generation device relative to each other, the method comprising:
obtaining a plurality of information items related to loads occurring between each of the plurality of drive devices and one of the two structures that receives forces generated by the plurality of drive devices;
controlling the plurality of drive devices based on the plurality of information items; and
in a case that at least one drive device of the plurality of drive devices is under a load equal to or greater than a threshold value in a state where each of the plurality of drive devices is controlled to generate a first predetermined braking force, controlling the plurality of drive devices to temporarily reduce each braking force of the at least one drive device, while temporarily increasing each braking force of other drive devices than the at least one drive device, which are under a load smaller than the threshold value.

5. A method of controlling a wind turbine power supply device for supplying an electric power to a plurality of drive devices for moving two structures included in a wind power generation device relative to each other, the method comprising:
controlling a power supply circuit of the wind turbine power supply device to supply an electric power to each of the plurality of drive devices, each of the plurality of drive devices including a brake unit configured to generate a higher braking force as supplied with a higher electric power;
obtaining a plurality of information items related to loads occurring between each of the plurality of drive devices and one of the two structures that receives forces generated by the plurality of drive devices;
controlling the power supply circuit based on the plurality of information items; and
in a case that at least one drive device of the plurality of drive devices is under a load equal to or greater than a threshold value in a state where the power supply circuit is controlled to supply a first predetermined electric power to each of the plurality of drive devices, controlling the power supply circuit to temporarily reduce the electric power supplied to each brake unit of the at least one drive device, while temporarily increasing the electric power supplied to each brake unit of other drive devices than the at least one drive device, which are under a load smaller than the threshold value.

6. The wind turbine drive control device of claim 1, wherein in a case that the at least one drive device is under the load equal to or greater than the threshold value in a state where each electromagnetic brake of the plurality of drive devices is controlled to generate the first predetermined braking force and a hydraulic brake of the wind power generation device is controlled to generate a second predetermined braking force, the control circuitry is further configured to control the plurality of drive devices to temporarily reduce a braking force of each electromagnetic brake of the at least one drive device, while temporarily increasing a braking force of each electromagnetic brake of the other drive devices and a braking force of the hydraulic brake.

7. The wind turbine power supply device of claim 2, wherein in a case that the at least one drive device is under the load equal to or greater than the threshold value in a state where the power supply circuit is controlled to supply the first predetermined electric power to each electromagnetic brake of the plurality of drive devices and supply a second predetermined electric power to a hydraulic brake of the wind power generation device, the control circuitry is further configured to control the power supply circuit to temporarily reduce the electric power supplied to each electromagnetic brake of the at least one drive device, while temporarily increasing the electric power supplied to each electromagnetic brake of the other drive devices and an electric power supplied to the hydraulic brake.

8. The wind power generation device of claim 3, wherein in a case that the at least one drive device is under the load equal to or greater than the threshold value in a state where the first and second power supply units are controlled to supply the first predetermined electric power to each electromagnetic brake of the plurality of drive devices so as to control each electromagnetic brake to generate the first predetermined braking force and supply a second predetermined electric power to a hydraulic brake of the wind power generation device so as to control the hydraulic brake to generate a second predetermined braking force, the control circuitry is further configured to control the switch to temporarily reduce the electric power supplied to each electromagnetic brake of the at least one drive device, while temporarily increasing the electric power supplied to each electromagnetic brake of the other drive devices and an electric power supplied to the hydraulic brake, thereby temporarily reducing a braking force of each electromagnetic brake of the at least one drive device, while temporarily increasing a braking force of each electromagnetic brake of the other drive devices and a braking force of the hydraulic brake.

* * * * *